No. 820,673. PATENTED MAY 15, 1906.
T. C. SANDERSON.
TIRE FOR VEHICLES.
APPLICATION FILED JULY 14, 1905.
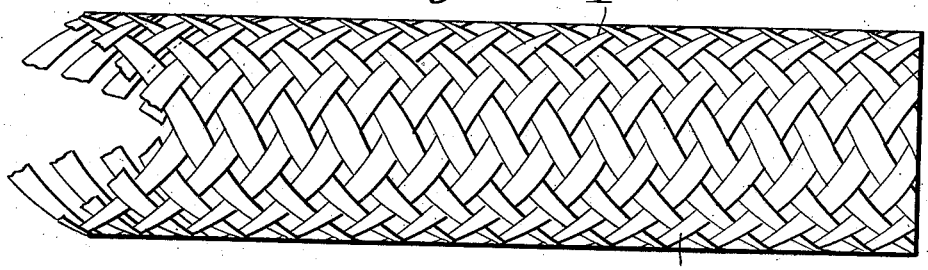
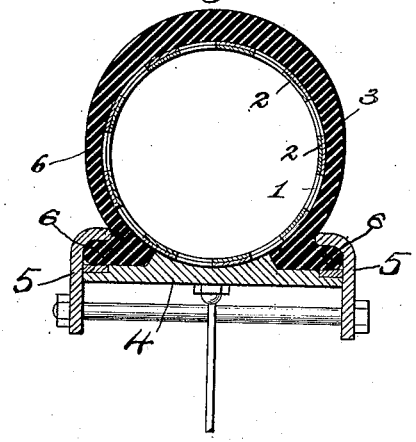
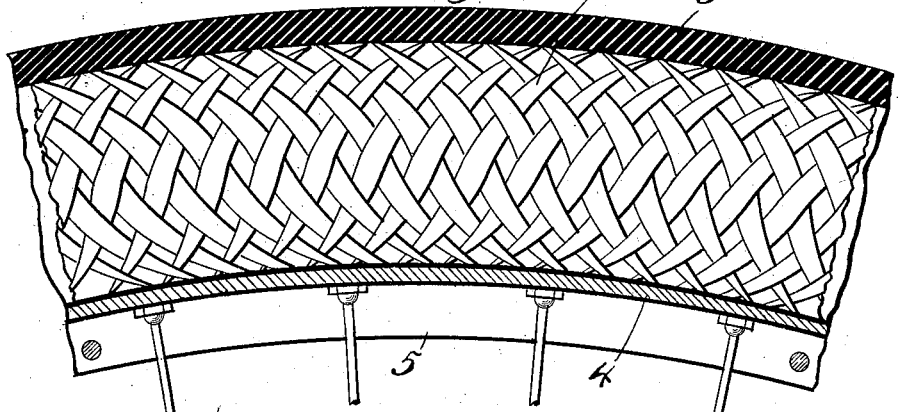
WITNESSES:
Emily G. Gravier
May L. McPike
INVENTOR
Thomas C. Sanderson
BY
Nicholas M. Goodlett Jr.
his ATTORNEY

UNITED STATES PATENT OFFICE.

THOMAS C. SANDERSON, OF WEST NEW BRIGHTON, NEW YORK.

TIRE FOR VEHICLES.

No. 820,673. Specification of Letters Patent. Patented May 15, 1906.

Application filed July 14, 1905. Serial No. 269,575.

*To all whom it may concern:*

Be it known that I, THOMAS C. SANDERSON, a subject of the King of England, and a resident of West New Brighton, Staten Island, in the county of Richmond and State of New York, have invented certain new and useful Improvements in Tires for Vehicles, of which the following is a specification.

This invention relates to new and useful improvements in vehicle-tires.

The invention seeks to provide an efficient and reliable tire which shall not be subject to injury from punctures.

The invention consists of the structure hereinafter set forth.

In the accompanying drawings, forming part of this specification, Figure 1 represents a portion of the woven tube employed in the construction of the tire. Fig. 2 is a transverse sectional elevation of a complete tire attached to the rim of a wheel. Fig. 3 is a longitudinal sectional elevation of the structure shown in Fig. 2.

1 is an elastic tube made of steel strands 2, woven spirally in opposite directions and formed into an annular tube. The strands may consist of tapes or bands, as shown, or they may consist of single wires or multiple wires braided together. The tube may be formed in a continuous piece and then be cut up into suitable lengths, which are then bent into annular shape and the ends of the strand suitably connected together to form the annular tube. As thus formed the tube may be extended considerably lengthwise, the diameter of the tube decreasing at the same time. In forming these tubes I make them of soft steel, and after forming the tube into an annular body it may be compressed by a mold or other suitable means, so as to have an annular diameter somewhat less than is required for the rim of the wheel to which it is to be fitted. While the tube is in this compressed condition it is then tempered, after which the annular diameter of the tube may be extended, so as to be sprung onto the rim of the wheel, where it will be held firmly by the elasticity of the steel. I may also employ an outer covering 3, of rubber, leather, or other suitable material, which protects the steel from wear and also to prevent dirt or other foreign material from clogging or filling the steel tube. The cover is preferably separable from the steel tube, as shown.

4 is the rim of the wheel to which the steel tube 1 and covering 3 are applied.

As shown in the drawings, the cover 3 is held in place by grippers 5, carried on the rim, these grippers engaging flanges 6, formed on the covering.

What I claim, and desire to secure by Letters Patent, is—

1. A vehicle-tire comprising an elastic annular tube made of steel strands woven spirally in opposite directions and subsequently tempered, substantially as set forth.

2. A vehicle-tire comprising an elastic annular tube made of steel strands woven spirally in opposite directions and subsequently tempered, combined with a covering of suitable material, substantially as set forth.

3. A vehicle-tire comprising an elastic annular tube made of steel strands woven spirally in opposite directions and subsequently tempered combined with a separable covering of suitable material substantially as set forth.

4. A vehicle-tire comprising an elastic annular tube made of steel strands woven spirally in opposite directions and subsequently tempered so that the annular diameter is less than that of the rim to which it shall be applied, substantially as set forth.

5. A vehicle-tire comprising an elastic annular tube made of steel strands woven spirally in opposite directions and subsequently tempered so that the annular diameter is less than that of the rim to which it shall be applied and combined with a covering of suitable material.

6. A vehicle-tire comprising an elastic annular tube made of steel strands woven spirally in opposite directions and subsequently tempered so that the annular diameter is less than that of the rim to which it shall be applied, combined with a separable covering of suitable material.

In testimony whereof I have signed my name to this specification in the presence of two subscribing witnesses.

THOMAS C. SANDERSON.

Witnesses:
KATHARINE MACMAHON,
NICHOLAS M. GOODLETT, Jr.